June 14, 1960

C. N. HOWARD 2,940,154

METHOD OF MAKING LIGHT WEIGHT AGGREGATE FROM
BITUMINOUS COAL REFUSE

Filed Nov. 5, 1956

INVENTOR
CHARLES N. HOWARD
BY
*Blair & Spencer*
ATTORNEYS

June 14, 1960 C. N. HOWARD 2,940,154
METHOD OF MAKING LIGHT WEIGHT AGGREGATE FROM
BITUMINOUS COAL REFUSE
Filed Nov. 5, 1956 4 Sheets-Sheet 2

FIG.1b

INVENTOR
CHARLES. N. HOWARD
BY
*Blair & Spencer*
ATTORNEY

United States Patent Office 2,940,154
Patented June 14, 1960

2,940,154

METHOD OF MAKING LIGHT WEIGHT AGGREGATE FROM BITUMINOUS COAL REFUSE

Charles N. Howard, Huntington, W. Va.
(Tru-Lite Corp., P.O. Box 351, Ceredo, W. Va.)

Filed Nov. 5, 1956, Ser. No. 620,244

13 Claims. (Cl. 25—156)

This invention relates to an improved light weight aggregate and to the method and apparatus for producing it. More particularly, it relates to a light weight aggregate made from coal refuse, particularly bituminous coal refuse, which contains its own fuel for processing, and to a method and apparatus for the production of such aggregate.

Aggregates are materials which are mixed with a cement to make concrete; thus, ordinary Portland cement concrete is made from Portland cement and an aggregate consisting of gravel and/or sand. While such concrete has a high compressive strength, it is also relatively heavy, having a density of about 150 lbs./cu. ft. In recent years various light weight aggregates have been devised which produce concrete having a decreased strength for the same cement content, but which is considerably lighter in weight than concrete made with sand and gravel. This light weight concrete may be made as strong as concrete made from ordinary cement by increasing the proportion of cement to aggregate. Such light weight concrete is very desirable for use in building blocks, since it produces a much lighter block; in concrete supported by other structures, i.e. building floors, concrete used for fire, insulating, bridge decks, etc., the strength of the supporting structures can be considerably reduced if light weight concrete is used, with resulting economy of construction.

Light weight aggregates may be naturally-occurring substances such as volcanic scoria, pumice, or diatomaceous earth; they may also be specially prepared materials such as expanded shales, clays, slates, or other bloating materials which are usually heated to obtain the desired bloating effect. Certain by-product materials such as expanded blast-furnace slags and coal cinders form a third group of light weight aggregates.

The bloating materials may be formed into aggregates by the so-called "Haydite" process. The first step in this process is to place the graded and screened materials from which the aggregate is to be made in a rotary kiln or drum. The drum is rotated and at the same time the internal temperature is raised by firing into one end of the kiln with a gas, oil, or pulverized coal burner or the like. This raises the temperature of the material making it plastic, and the gas entrapped therein is caused to expand, bloating the material therein. The bloated material is then removed from the kiln and crushed to form a light weight aggregate.

This process, however, is not practical for use with material containing any appreciable amount of combustibles. Aggregates used to manufacture concrete should have a low ignition loss, i.e. when burned, a minimum amount of aggregate should be lost. This is desirable to prevent failure of concrete structures as a result of fire. ASTM Specifications C330–53T and C331–53T for light weight aggregates specify that ignition loss for these materials must not exceed 5% by weight for an acceptable aggregate.

If combustion air is introduced into the kiln in the Haydite process to burn combustibles in the material and thus reduce ignition loss of the product, individual particles are raised above their incipient fusion temperature causing them to stick to the refractory lining of the kiln forming "rings" and "logs." A rotary kiln is also particularly unsuitable to any material containing any appreciable volatile content, such as bituminous coal, since, in the absence of oxygen, volatile gases are discharged unburned, creating a substantial air pollution problem.

Thus, materials containing appreciable amounts of combustible materials, and in particular volatile materials, cannot be satisfactorily made into light weight aggregates by this process since combustibles cannot be satisfactorily removed in the process and the ignition loss of the product would be too high to be acceptable.

Another method heretofore used to manufacture light weight aggregate utilizes a so-called "sintering machine." In this process the clay or shale mixed with a finely divided non-volatile fuel such as anthracite coal or coke breeze is placed on a traveling grate which moves over compartmented wind boxes. An exhaust fan connected to the wind boxes draws combustion air downwardly through the charge of material. An ignition hood having a heated refractory lining is placed over the first wind box igniting the top of the bed by radiation. The plane of ignition travels downwardly through the bed as it moves across the machine, fusing the clay or shale into a massive clinker containing trapped air bubbles, and thus producing an expanded material. The resultant clinker is crushed and graded to form a light weight aggregate.

This process is thermally efficient since the hot products of combustion are drawn over the unburned material preheating it. However, there is a definite maximum limit, approximately 2000 B.t.u./lb. as charged, to the amount of fuel which can be used, since the exit gases must pass through a perforated metal grate and, if their temperature is too high, the grate will be damaged. Also, a nonvolatile-noncaking fuel must be used since volatiles are distilled off below the ignition zone in the absence of oxygen, creating a considerable air pollution problem and, if the fuel has any caking or coking tendencies, heating it in the presence of hot nonoxygen bearing gases will cause it to become plastic, with resulting swelling. This will seal off the bed, making it difficult to pull combustion air through the charge and necessitating excessively large fans. In both the Haydite and sintering machine processes, a high grade fuel is required, and the cost of this fuel represents approximately 30% of the cost of manufacture of the aggregate.

To make slag aggregate, the hot slag from a blast furnace is contacted with a controlled quantity of water. The resulting steam causes expansion of the slag into a porous, foam-like material which is cooled and solidified in the expanded state in air. This solid material is then ground to form a light weight aggregate.

It has been recognized that the clinker made by burning ordinary bituminous coal is useful as a source of light weight aggregate, and such clinkers have heretofore found wide acceptance for this purpose. However, such clinkers are a by-product of a bituminous coal combustion process which is designed primarily to utilize the heat content of the fuel efficiently, and not to produce a clinker for manufacture into aggregate. For example, under peak load conditions in a boiler plant, there are relatively large amounts of unburned fuel in the clinkers. Conversely, under light load conditions insufficient heat is produced to fuse the mineral matter into a clinker. Clinkers made under such peak load conditions would show very high ignition loss, while those made under light load conditions would not be as light weight as would be desirable for use in making an aggregate.

Aggregate made from such bituminous coal clinker also showed heavy staining and concrete made therefrom had considerable surface "pop-out" caused by swelling of particles of hard burned lime. These effects are caused by impurities normally present in any low ash bituminous coal.

The refuse produced in the mining and preparation of bituminous coal has heretofore been considered to be too high in combustible values to produce a desirable aggregate in a rotary kiln or sintering machine, and too low to be burned in the conventional manner. Thus, if it is attempted to use the Haydite process with such refuse, which normally contains 30 to 60% combustibles, the resulting aggregate will have too high an ignition loss to be acceptable. If air is introduced into the kiln to burn these combustibles, the undesirable effects previously described will occur. Coking and caking of the material bed will occur if it is attempted to process such refuse on a sintering machine with a resulting air pollution problem and poor clinker formation. Also, since bituminous coal refuse contains approximately 4500 B.t.u./lb. on a dry basis, grates of the sintering machine will be damaged by the excessive heat which is generated. Accordingly, neither of the prior processes are useful with bituminous coal refuse since they cannot effectively utilize the fuel present in the refuse, and do not result in the production of a satisfactory clinker.

Accordingly, it is a principal object of my invention to provide a method and apparatus for making light weight aggregate from bituminous coal refuse, a material which has heretofore been considered a waste product, which is readily available, and which contains sufficient combustible material for its own processing. Another object of my invention is to provide a method and apparatus of the type described which utilizes bituminous coal refuse as its raw material from a nonhomogeneous source, i.e. a source from which the combustiblity of the refuse varies. A still further object of my invention is to provide a method and apparatus of the type described capable of utilizing bituminous coal refuse whose size gradation and percent moisture is variable. Still another object of my invention is to provide a method and apparatus of the type described which is susceptible of high production rates. A still further object of my invention is to provide a method and apparatus of the type described which will prevent coking and provide an improved clinker for grinding into the light weight aggregate. Another object of my invention is to provide a process and apparatus of the type described which will produce an aggregate without at the same time causing an air pollution problem. A still further object of my invention is to provide a method and apparatus of the type described which is economical in types of apparatus used and yet susceptible of semi-automatic operation, thus further reducing the cost of the finished aggregate. Yet another object of my invention is to provide an improved light weight aggregate made from bituminous coal refuse for use in the manufacture of light weight concrete for concrete blocks and in light weight poured-in-place concrete. Still another object of my invention is to provide a lightweight aggregate from which concrete may be made which will have extremely light staining as defined in ASTM Specification No. C331-53T. Still another object of my invention is to provide a light weight aggregate which is lighter in weight and has reduced "pop-out" as compared with aggregates heretofore made from bituminous coal and yet produces concrete of superior strength. Other and further objects of the invention will in part be obvious and will in part appear hereinafter.

The invention accordingly comprises the several steps and the relation of one or more of such steps with respect to each of the others, and the apparatus embodying the construction, combination, and arrangement of parts which are adapted to affect such steps, and the product which possesses the characteristics, properties, and relation of characteristics and properties all as exemplified in the detailed disclosure hereinafter set forth, and the scope of the invention will be indicated in the claims.

For a fuller understanding of the nature and objects of the invention, reference should be had to the following detailed description taken in connection with the accompanying drawings in which.

I have found that the improved light weight aggregate of my invention may be economically made from bituminous coal refuse if the refuse is prepared by pelletizing and then burned in an oxygen-rich atmosphere, the air rate being controlled during burning. The refuse may be stored in large "ponds" or it may be fed to the process of my invention directly from the coal separation process. Its size gradation, percent of combustibility, and moisture content will vary. In order to burn it to form a fused clinker, it is necessary to first form it into particles of similar and substantially uniform size which form an air permeable bed. The moisture content of these particles must also be controlled to insure proper burning. By controlling air rates and rate of travel of a traveling grate stoker used in the furnace, adjustment may be made for variations in combustiblity of the material.

I have also found that an updraft furnace utilizing a traveling grate stoker with an overhead refractory arch which will heat to incandescence will provide a clinker of the desired characteristics and will cause combustion of the prepared refuse at a sufficiently high rate to be economical. The furnace preferably has a non-heat absorbing surface immediately above the pellet entrance so that it will radiate heat to the pellet bed to ignite it. I have found in addition that, for proper combustion, the air rates in various sections of the furnace must be carefully adjusted. Thus, initially, it is preferable to allow the upper surface of the bed of prepared refuse passing through the traveling grate stoker to be ignited by radiant eneregy from the incandescent arch and to pass no air through the bed. After initial ignition air is forced upwardly through the bed at a controlled rate until the entire bed is ignited, the plane of ignition traveling downwardly against the air flow. When the bed is totally ignited, I have found that it is desirable to have extremely high air rates to consume the combustibles in the refuse and cause mineral matter to heat to above its fusing temperature to form a large bloated clinker. It is desirable to allow this clinker to cool in the furnace before further cooling by water quenching. These large clinkers are then successively reduced in size by crushing and grinding to form the light weight aggregate which is the product of the process herein described.

It is important to note that one of the major problems involved in devising a workable process and apparatus to produce light weight aggregate from bituminous coal refuse is an economic one. Thus, the process must produce the burned clinker with sufficient speed so that it can be processed and sold at such a rate that the resulting income will pay not only the immediate operating expenses of the process but also pay for plant amortization and return a profit to investors. Because of the low combustibility of the raw materials used herein, it is important to obtain the maximum ignition rate of the materials in the furnace since this limits the rate of grate travel and thus the production rate. The bed of material from which the clinker is to be made must be moved through the furnace sufficiently slowly so that the entire bed is ignited and burned. If the traveling grate must run at a relatively slow speed to permit this because of a low ignition rate, the production rate goes down and the plant income drops. Accordingly, to achieve the necessary production rate, preparation of the raw materials, to be described in more detail hereinafter, is of major importance in achieving a high ignition rate and an economically useful process.

Raw material

More specifically, the raw materials from which the light weight aggregate of my invention is made and which are used in the process and apparatus herein described comprise the refuse obtained from a bituminous coal cleaning plant. In such plants the coal is separated from the refuse by introducing the mixture into a vessel containing a fluid medium with a mechanically or chemically maintained specific gravity which is greater than that of the coal and less than that of the refuse. The coal floats on top of the medium and is skimmed off, while the refuse sinks to the bottom and is removed from the vessel. Within the limitations of the washability characteristics of the coal seam from which the coal was obtained, the ash content of the coal can be varied by changing the specific gravity of the medium, i.e. as the specific gravity approaches that of the coal, more material will be washed out and the ash content of the remaining coal will be reduced. At the same time the combustible content of the rejected material increases with a decrease in the specific gravity of the medium. Therefore, depending on the clean coal requirements of any given coal washing plant, there will be a wide variation in the combustible content of the refuse. The refuse separated is a nonhomogeneous mixture of carbonaceous shales, high ash bone coals, and misplaced particles of coal which were trapped and did not float to the surface of the vessel. The refuse so separated, as previously described, is sometimes carried from the cleaning plant and dumped into a large refuse "pond," or it may be fed directly to the aggregate making process herein described. The material in general has an average analysis of approximately 30 to 60% combustible materials, i.e. on combustion between 30 and 60% by weight will burn, and on burning will yield between 4500 and 7000 B.t.u./lb. on a dry basis. In size it ranges from pieces as large as 5 inches to "fines." Before being used in the process of my invention, this material is crushed to a size range of ⅜″ to 0." It should be understood that all refuse will not necessarily have the same combustibility, size gradation, or moisture content. Thus, one of the major problems in utilizing this refuse to manufacture a light weight aggregate is to make a reasonably homogeneous material in a proper size to improve the ignition rate prior to processing to form the clinker.

Refuse preparation

Figure 1A:
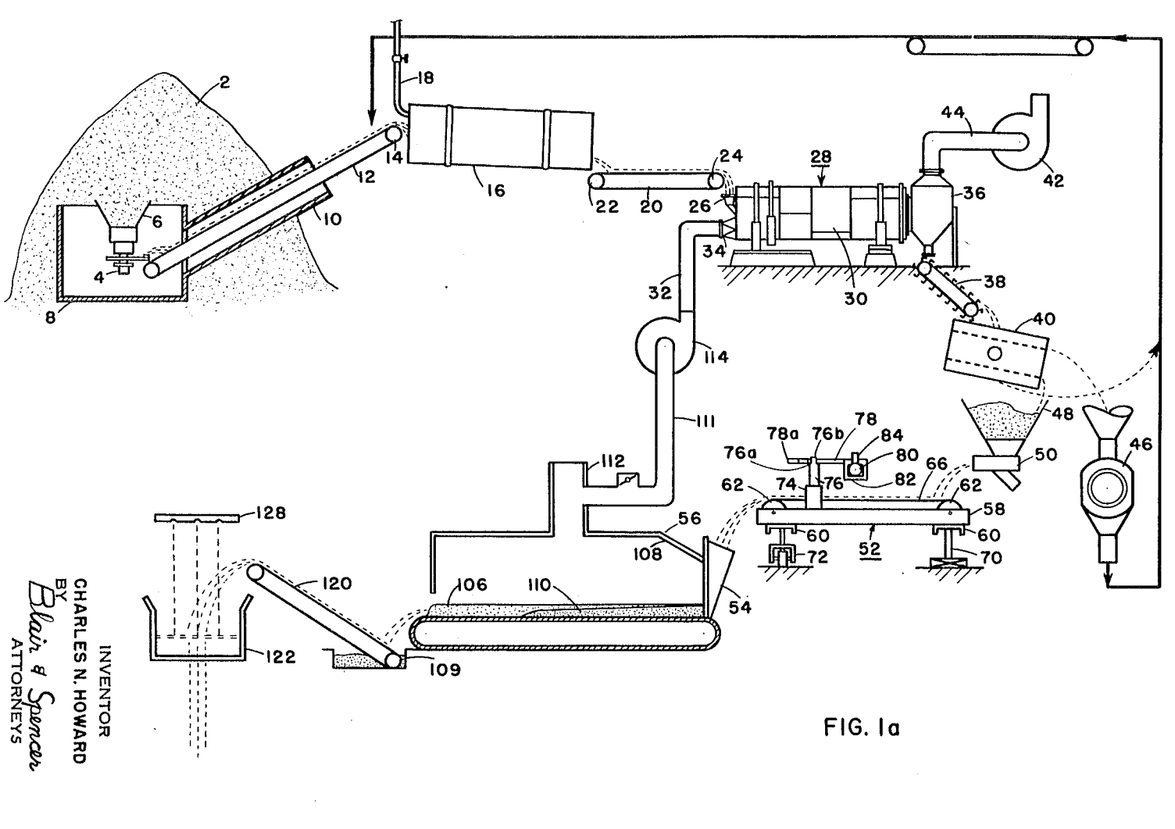
Figure 1a is a schematic flow illustrating the location, arrangement, and types of apparatus and the order of steps utilized in the practice of the process of my invention.

Turning to Figure 1a, if the material is stored in a refuse pond, it is pulled by a power scraper or the like (not shown) into a drainage pile 2 where some of the moisture which the material contained while in the pond is allowed to drain therefrom. If the material is fed directly from the plant, it is dewatered by a mechanical means (not shown) such as a centrifugal drier, dewatering screen, or vacuum filter prior to being stored in the drainage pile. A rotary table feeder 4 is located at the base of a bin 6 which in turn is supported in an upstanding section of pipe 8 located in the center of drainage pile 2. A recovery tunnel 10 leads from the base of pipe 8 to the outside of the drainage pile 2 and encloses a belt conveyor 12. The head pulley 14 on belt conveyor 12 is a permanent magnet and thus tramp iron will not be discharged from the conveyor 12 at its upper end but will fall from the underside of the conveyor after it passes beyond pulley 14.

The refuse from pile 2 is fed through bin 6 and rotary table feeder 4 on to conveyor 12 which carries it to pelletizing drum 16. Drum 16 comprises an open-ended cylindrical member in which the material is deposited along with sufficient moisture to form pellets. This drum is rotating at a constant speed and the refuse deposited therein either has sufficient moisture in it or sufficient moisture is added from water pipe 18 so that, as the drum rotates, the "fines" in the refuse will form pellets around the larger particles which act as nuclei. Drum 16 is tilted at approximately 5° so that the right end as viewed in Figure 1 is slightly lower than the left end. The material thus traverses the rotating drum by gravity following a substantially helical path. In practice I have found that it is desirable to make the drum approximately 4½ feet in diameter and approximately 15 feet long, for a feed rate of 30 tons of raw refuse per hour. To achieve good pelletizing action, the moisture content of the material fed thereto should be between 10 and 15% and preferably should be of the order of 12%. Water should be added if moisture content falls below 10% to assure sufficient pellet growth. To form desirable pellets, I have found that the drum 16 should be preferably rotated about 10 r.p.m., although other speeds might of course be used.

The pellets for use in my process, to be hereinafter described, should be essentially spherical to obtain maximum permeability for a given void ratio, i.e. for a given amount of void space. The pellets should also be compressed so that they have substantial dry strength and can therefore be screened to proper size range with minimum breakage. The pellets produced by the pelletizing apparatus described herein have these desirable characteristics. However, pellets produced by a pelletizer containing a breaker bar or paddle screw, which are sometimes used in other light aggregate processes, are flat and slab-like in shape and would not be satisfactory for use in my process. Such pelletizers are normally used to prepare clays in the process utilizing a sintering machine.

While I have described a preferred type of pelletizer for producing the substantially spherical compressed pellets for my use in the process herein described, it is to be understood that other types of pelletizers capable of producing such pellets might also be used.

The pellets discharged from the right end of drum 16 are deposited on a high speed belt conveyor 20. The pulleys 22 and 24 associated with this conveyor are smaller than those normally associated with conveyors of this type. Because of the high speed and small pulley radius, the wet, sometimes sticky, pelletized refuse deposited on conveyor 20 is thrown therefrom with considerable force at the discharge end into the hopper 26 of the drier generally indicated at 28. While any conventional drier for granular material that does not break up the pellets might be used for drier 28, I have found that rotary louvered driers are particularly adaptable for use in the process of my invention. Driers of this type include a revolving horizontal cylindrical drum 30 having a slotted inner shell (not shown) that increases in diameter from the feed end to the discharge end. Radial plates partition the space between the two shells into long narrow channels open at the larger or input end of the drier and closed at the shallow end. The inner shell is made up of substantially L-shaped plates that overlap to form full-length slots or louvers which support the material bed and yet permit heated air to pass freely through it from the channels between the shells. As the drum revolves, the material rolls over and over itself in a spiral path from the small diameter feed end to the larger diameter discharge end. Heated dry air from the furnace, to be hereinafter described, is introduced through duct 32 and air inlet 34 into the channels at the feed end and passes through the pellets in the drier 28 to evaporate the moisture therein. Because of the smaller diameter of the inner shell at the feed end, the pellet bed at this point is thinner than at the discharge end and, accordingly, a larger volume of heated dry air penetrates the bed of pellets where the material has the greater moisture content. As the pellets move forward and the bed becomes thicker, the air passages get smaller so that a reduced volume of heated air penetrates the bed to prevent overheating. Driers of this type are particularly useful in the process of my invention since not only do they dry the pellets formed in the pelletizing drum, but they also accomplish some additional pelletizing while drying. However, it is not desirable to use the drier alone to form pellets since moisture cannot be introduced therein, which is sometimes necessary as previously explained.

After drying, the pellets pass out the bottom of the gas exhaust stack 36 and from there are carried by a bucket elevator 38 to a conventional double-deck vibrating screen 40. The air introduced into drier 28 is exhausted therefrom by fan 42 via duct 44 which is connected to the outlet at the top of stack 36. The top deck of screen 40 has a ⅜ by ⅜ mesh and is preferably made of stainless steel cloth; thus, only particles ⅜ or smaller will pass through the top deck of the screen. The larger particles which do not pass the upper screen are removed from one side thereof and are fed by a conveyor (not shown) to a conventional hammer mill crusher 46, and from there are returned to conveyor 12 feeding pelletizing drum 16. The lower deck of screen 40 has a ⅛ by ⅛ mesh of material substantially the same as the top deck. All the pellets not passed by this screen are used in the process, while the very small pellets, the "fines," are combined with the ground pellets from crusher 46 and returned to conveyor 12.

Thus, the pellets passing the screen preferably range in size from ⅜ to ⅛ with no more than 10% passing a ⅛" mesh. These sized pellets are fed to a surge bin 48. A conventional vibrating feeder 50 located at the bottom of bin 48 feeds the sized, dried pellets to a distributing belt conveyor generally indicated at 52.

A distributing conveyor should be used to feed the wide mouth of hopper 54 on furnace 56 from a narrow belt conveyor. If the sized, dried pellets from bin 48 were merely dumped in the center of the hopper, the smaller pellets and the fines would tend to travel to the center of the hopper, while the larger pellets would concentrate at the edges thereof. This would result in a similar distribution in the pellet bed with consequent variable ignition rate and uneven burning. I have substantially eliminated this problem by loading the hopper 54 from a distributing conveyor generally indicated at 52 whose discharge end reciprocates laterally across the hopper 54 to form a pellet heap extending over the entire width thereof.

More particularly, as seen in Figure 1a, conveyor 52 has a rectangular frame with side members 58 and cross members 60. Two suitable pulleys 62, one of which may be driven by an electric motor (not shown), are journalled in side members 58 and support thereon a conveyor belt 66. Thus, upon counterclockwise rotation of the pulleys and corresponding movement of the belt, the conveyor 66 is adapted to receive pellets entering from the right and discharge them on the left. The receiving end of the conveyor is pivoted as at 70, while the discharge end is supported on casters 72. Thus, the discharge end of conveyor 52 may be arcuately reciprocated about the receiving end thereof to discharge the pellets over the width of the hopper 54. The mechanism for reciprocating the conveyor includes a suitable supporting member 74 secured across side members 58. Affixed thereto is an upstanding bar or rod 76 shouldered as at 76a to form a stud portion 76b and support a traversing arm 78. Stud portion 76b is preferably rectangular in lateral cross section so as to snugly and slidably interfit within an elongated slot 78a in arm 78. Thus, arm 78 may move longitudinally along the conveyor 52 but may not pivot about it, and lateral movement of the arm will be transmitted through rod 76 to the conveyor to reciprocate the discharge end thereof in the desired manner.

A shaft 80, rotatably supported independently of conveyor 52, is encircled by a box-like structure 82 depending from arm 78. Shaft 80 has formed along its surface two oppositely turning helical grooves (not shown) joined at their ends by a pair of circumferential grooves. A pin 84 pivotally connected to arm 78 has a lug portion formed on its lower end which is adapted to ride in the grooves in shaft 80. Thus upon rotation of the shaft, a helical groove acts on pin 84 to force it longitudinally of the shaft and, through arm 78, move the discharge end of conveyor 52 laterally about pivot 70. When the lug on pin 84 reaches the end of the helical groove, it engages a circumferential groove and travels along it to enter the other oppositely turned helical groove. Continued rotation of shaft 80 then moves the lug and the discharge end in the opposite direction until the other end of the groove is reached, where a similar reversal of direction takes place. The operation of the shaft 80 and pin 84 is similar to the operation of the level-wind mechanism on a conventional fishing reel. In this manner, the discharge end of conveyor 52 is made to reciprocate about the pivot point 70, and the sized dried pellets are distributed evenly into hopper 54 without segregation.

*Combustion of prepared materials*

Figure 2:
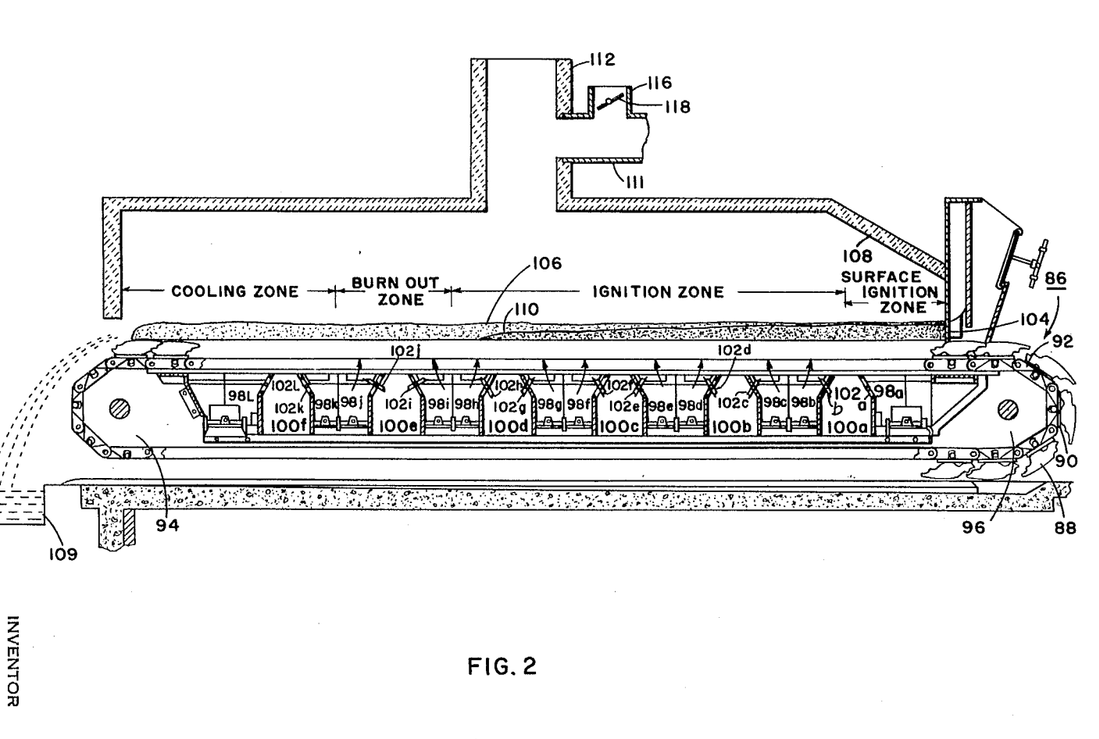
Figure 2 is a simplified section through the furnace shown in Figure 1a, illustrating the combustion sequence therein.

Furnace 56 is best seen in Figure 2 and, as shown therein, it includes a traveling grate stoker generally indicated at 86, the grate being formed by a plurality of keys 88 supported on carrier bars 90, the carrier bars in turn being pinned to an endless link chain 92 passing over sprockets 94 and 96. Keys 88 are spaced from each other to allow air to pass therethrough, the grate open area being between 5 and 8% for bituminous coal refuse. The particular stoker which I use is approximately 10 feet wide, the distance between sprocket centers being 35 feet. The effective grate surface on which combustion can take place is approximately 10 by 30 feet. The shaft associated with either of the sprockets 94 or 96 is driven by a hydraulic vane-type motor (not shown) supplied from a conventional hydraulic pump. This arrangement permits variable speed control of the grate to adjust for variations in the combustibility of the pellets fed to the furnace.

Forced air is supplied to twelve wind boxes 98a through 98l, located under the grate, the wind boxes being supplied through six ducts 100a through 100f. Dampers 102a through 102l are provided in the side of each duct and, by adjustment of the dampers, the amount of air fed to any individual wind box may be controlled. In practice I have found that the dampers to each wind box may be set to the desired adjustment and the air rate controlled by controlling the air flow to the ducts 100a, b, c, d, e, and f. The opening 104 at the base of hopper 54 is of a variable height to provide a bed 106 of sized, dried pellets of variable depth on the traveling grate 86. In practice I have found that the bed should be between 4 and 8 inches and preferably about 6 inches thick to achieve optimum production. A plastic refractory arch 108 having the approximate cross-sectional shape indicated in Figure 2 is located above the traveling grate; its function will be described hereinafter.

The line 110 in material bed 106 indicates the manner in which the ignition plane travels from the surface of the bed to the bottom thereof as the bed progresses through the furnace, i.e. all material above the line 110 as shown in Figure 2 has been ignited while all material below the line is unburned.

Figure 3:
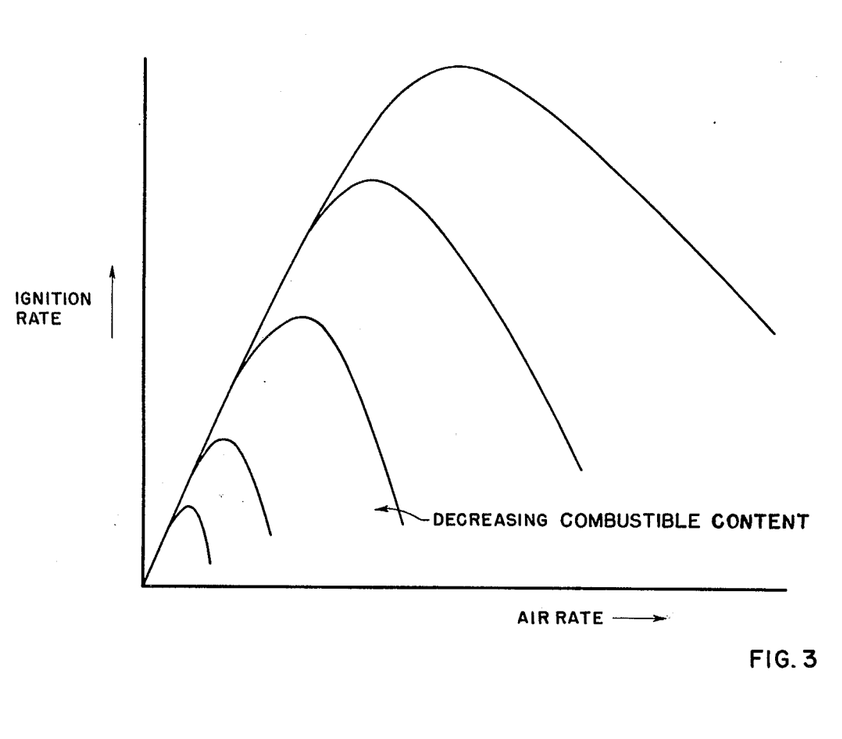
Figure 3 is a graph showing the relation between air rate and ignition rate in a traveling grate stoker for material of decreasing combustibility.

To understand the combustion process by which the sized, dried pellets fed into hopper 54 are converted to a desirable clinker which may later be ground to form the aggregate, it is necessary to understand the theory of updraft ignition. As used herein and in the claims, updraft ignition is defined as ignition in which the travel of the ignition plane in the raw fuel is opposite to the flow of combustion air through the fuel. Thus, each particle of fuel must be ignited from the particle adjacent to it by radiation while being ventilated by the combustion air. In this type of ignition there exists an optimum air rate which gives maximum ignition travel for any fuel. As the combustible content of the fuel decreases, this maximum rate of travel decreases, and the range of air rates at which any ignition travel takes place decreases. This is illustrated in Figure 3 wherein the ignition rate is plotted as a function of the air rate for fuels of varying combustible content. As the combustible content decreases, it will be noted that the range of air rates over which high ignition rates can be obtained becomes extremely narrow. Thus, the poorer the fuel, the more critical control of combustion air becomes. In my process, which utilizes a material which is about 50% combustible, careful control of combustion air is essential.

From Figure 2 it will be seen that the damper 102a leading from the air duct 100a to the wind box 98a on the right hand side of the stoker is closed. Thus, no air is forced upwardly through the bed during the initial portion of its travel through the furnace, to prevent cooling thereof by the air flow. Rather, the upper surface of the bed is ignited by radiant heat from the arch 108. The arch heats to incandescence because of carbon monoxide gas burning over the ignited bed farther down the grate in the ignition zone. The arch temperature is approximately 2000 to 2200° F., sometimes reaching 2500° F. Once the surface of the bed has been ignited, a controlled amount of air is blown through the pellet bed as it travels through the furnace. I have found that a rate of between 75 and 175 lbs. of air per square foot of grate area per hour to be the desirable range of air rates, depending upon the combustibility of the material. The dampers 102b, c, d, e, f, g and h leading from the ducts 100a, b, c, and d supplying wind boxes 98b, c, d, e, f, g, and h are shown as partially open. The amount of air fed to bed 106 from these seven wind boxes varies depending upon the combustibility of the material being controlled by dampers in the air lines feeding the ducts. I have found that these air rates can be satisfactorily controlled by the furnace operator by observation of the clinker bed as it emerges from the furnace.

If the air rate to the seven wind boxes previously mentioned which are in the ignition zone is incorrect, this can be ascertained by the shape of the unburned portion of the bed 106 emerging from the furnace. As a result of leakage at the edges of the grate, the air rate is slightly higher at the grate edges than at the center. Thus, if the line separating the burned and unburned portions is concave downwardly, the air rate is too high, since better burning was achieved at the center where the air rate was lower than at the edges. Conversely, if the shape is reversed and the line is concave upwardly, i.e. the central portion is higher than the edges, then the air rate is too low, since better combustion was achieved at the edges where the air rate was higher than in the central portion of the grate. Thus, by observing the bed as it leaves the furnace and observing the shape of any unburned portion, the operator can properly control the air rate. This is the only place in my process that an operator is required, all other appparatus being adapted to be automatically controlled.

The furnace operator, by controlling the rate of grate travel and the amount of air fed through the bed 106 from the second through the eighth wind boxes, the ignition zone, can insure that the bed is completely ignited when it reaches the ninth and tenth wind boxes, the burnout zone.

As shown in Figure 2, the dampers 102i and j leading from air duct 100e and associated with the wind boxes 98i and 98j are wide open. Maximum air flow up to the point where the bed leaves the grate is maintained through the bed 106 at this point to achieve the highest possible temperatures to obtain fusion, and bloating of the clinker. I have found that between 750 and 1000 lbs. of air per square foot per hour, depending upon bed resistance, are desirable air rates in this region. Because of the high temperatures and high air rates, bloating and fusion of the clinker takes place in the burn-out region. As soon as all combustibles burn out, the temperature drops rapidly, freezing the clinker in its bloated form. It will be noted that the dampers 102k and 102l associated with the wind boxes 98k and 98l are almost closed, i.e. in the last two sections very little air is blown through the bed and the bed is allowed to cool. The small volume of air is used to burn out any patches that are unburned and to further cool the clinker. The end of the bed at the discharge end of furnace 56 breaks off by its own weight and the large clinkers fall into the water pit 109. I have found that, with materials of relatively high combustibility, it is possible to operate the traveling grate at a speed of approximately 35 to 40 feet per hour. With refuse of average combustibility, the speed is approximately 30 to 35 feet per hour, thus taking approximately one hour from the time the material is first inserted into the furnace until it emerges at the other end as clinker. These speeds give an approximate production rate of 20 lbs. of aggregate per square foot of grate area per hour.

It will be noted that a duct 111 leads from the stack 112 of furnace 56 to a fan 114 (Figure 1a), the outlet of fan 114 in turn feeding duct 32 to supply heated air to drier 28. The air leaving stack 112 is too hot to be fed directly to drier 28; accordingly, a tempering air inlet 116 is provided having an automatically controlled damper 118 therein. Damper 118 is controlled by a thermostat (not shown) located beyond it in duct 111 to admit that amount of tempering air to maintain the air temperature in duct 111 at about 900° F. This insures that the air fed to drier 28 is at a sufficiently low temperature that it will not burn the pellets therein, but will accomplish efficient drying.

Clinker crushing

Turning back to Figure 1a, the large cooled pieces of clinker in pit 109 are carried by an apron conveyor 120 to a foundry shakeout 122 which is normally used for shaking sand from castings. However, I have found that this apparatus is particularly useful for crushing the large pieces of clinker from the furnace to a granular form.

Foundry shakeout 122 consists of a resiliently mounted open rectangular box having a grid of heavy bars which are "hard-faced" for abrasion resistance forming its bottom. I have found a grid having 2" x 2" spacing is particularly useful for clinker crushing. The box is shaken or vibrated through a linkage driven by an electric motor or the like. The clinkers from the furnace drop into the shakeout from conveyor 120 and pile fairly deeply therein. The jogging or shaking action imparted to the clinkers causes them to crush themselves both against the grid and against each other. The heavier the load of clinker, the more weight there is above those immediately adjacent the grid, and the more efficient is the crushing action obtained. The self-crushing feature is important in the use of this device, since the clinker is extremely abrasive, and rapidly wears conventional crushing apparatus. I have found that approximately 1 ton of clinker may be crushed so that it all passes the 2" x 2" mesh of the shakeout per square foot of grid area per hour. The shakeout does not wear as fast as conventional apparatus used for this purpose, as previously explained, and is much easier to maintain. The crushed material from foundry shakeout 122 falls on a conventional stacking conveyor 124 (Figure 1b) which carries it to a stock pile 126. A water spray 128 (Figure 1a) is located above the foundry shakeout 122 to spray on the clinker therein and on the crushed product. The spray cools the clinkers, both to protect the belt of conveyor 124 and to insure that they are cool prior to further grinding and storage. Because of the excellent insulating qualities of the aggregate, if they are not cooled prior to storage, they will retain a substantial portion of their heat, even if stored for a long period and will have to be cooled before being made into concrete. The water spray protects the belt of conveyor 124 by causing it to become coated with a paste-like material composed of the water and the "fines" made in crushing the clinkers. This insulates the conveyor belt from the hot crushed clinkers. The spray also minimizes dust in the vicinity of the crushing operation.

Figure 1B:
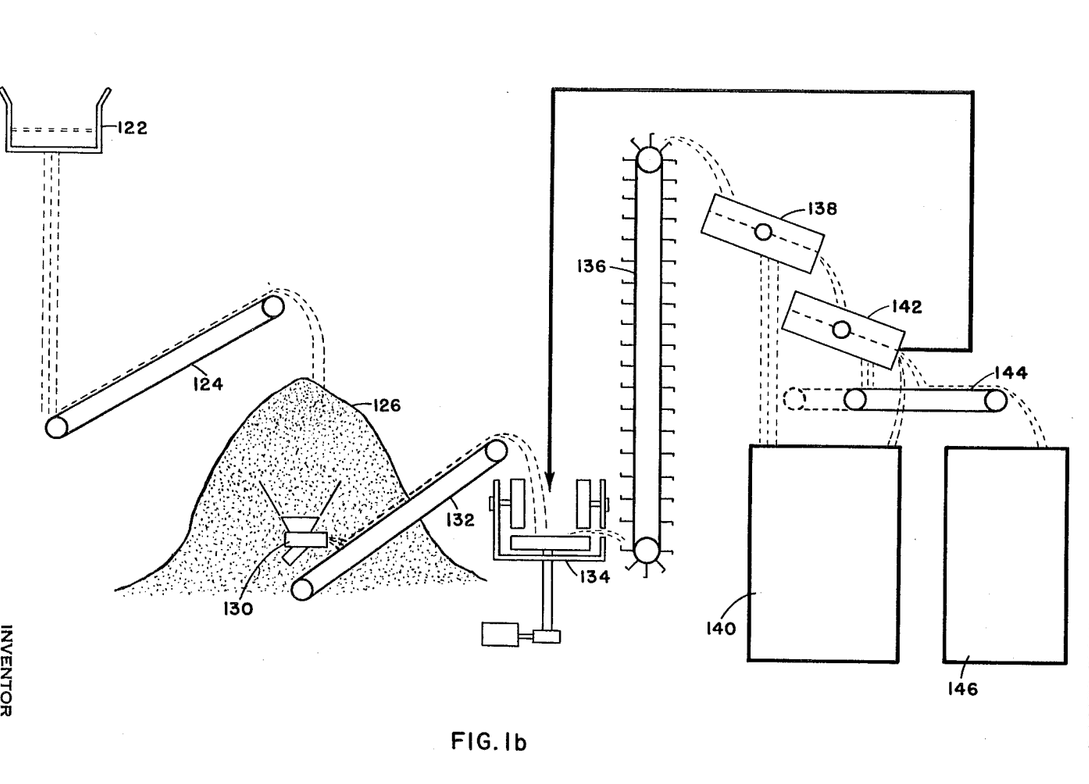
Figure 1b is a continuation of the diagram of Figure 1a showing the crushing and screening process.

The crushed material stored in stock pile 126 may be shipped or used in this form, although it is preferably fed by a vibrating feeder 130 or the like to conveyor 132 which carries it to a rim grinder 134. Grinder 134 crushes the material to a maximum size of 3/8" ranging down to fines. The crushed material from grinder 134 is carried by a bucket elevator 136 to a single deck vibrating screen 138. Screen 138, which is located over storage silo 140, has a 1/8" x 3/4" mesh. All particles passing this screen are deposited in storage silo 140. The oversize particles are carried to a second vibrating screen 142 having a 3/8" x 3/4" mesh. All oversize particles not passing this screen are returned by a conveyor (not shown) to grinder 134 to be further crushed and screened. The particles passing screen 142 may be deposited with the particles passing screen 138 in silo 140 if desired. However, if it is desired to segregate the material according to size, a movable conveyor 144 may be positioned under screen 142 to carry the particles passing therethrough to a second storage silo 146. The material from the two silos may then be mixed to form an aggregate having the desired particle size gradation depending upon application.

*The product*

The completed light weight aggregate is reddish gray in color and has a density of between 50 and 55 lbs. per cubic foot in the size range 3/8" to 0, with a fineness modulus of 3.6. Although its appearance somewhat resembles the ground-up cinders from soft coal, in fact it possesses several desirable attributes not found in such cinders for use as a light weight aggregate. For example, this material, when subjected to the staining test described in ASTM Specification C331–53T, shows only a very light stain. Most aggregate made from bituminous cinders shows either heavy or very heavy staining in this same test. Further, the light weight aggregate made according to my invention contains no burned lime particles as may aggregate made from bituminous coal cinders. Thus, concrete made from my aggregate shows very little "pop-out." Pop-out, which is the breaking off of small pieces on the surface of concrete, is caused by swelling of such burned lime particles when they absorb water. Concrete made from this aggregate having a size range 3/8" to 0 and a fineness modulus of 3.6 mixed in a ratio of 1 cement to 3.5 aggregate by weight shows a water absorption of about 12.5 lbs. of water/cu. ft. This is somewhat lower than other light weight aggregates and may be due to the nonporous glassy surface obtained as a result of the high temperatures achieved during burn-out. The ignition loss is of the order of about .3 to 5%. This is much lower than aggregates made from bituminous coal cinders, which are allowed by ASTM specification to have ignition loss as high as 30%. This ignition loss compares with light weight aggregates made from expanded clays, shales, etc. by the processes previously described.

The principal use of my aggregate has been in the manufacture of conventional concrete blocks. If such blocks are made in the ratio of 1 part cement to 3.5 parts by weight of aggregate made according to this process, the aggregate having a fineness modulus of about 3.6, they will have a compressive strength of the order of 1300 lbs. per square inch. This compares with the compressive strength of blocks made from ordinary concrete, yet such blocks weigh only about 27½ lbs. This weight compares with a weight of 38 lbs. for a block made from slag aggregate and a weight of approximately 45 lbs. for a concrete block made from conventional concrete. These blocks are light gray in color and have an excellent texture. As previously mentioned, the aggregate also is harsh and abrasive and has use on snowy or icy roads to provide traction. While its cost per ton is greater than the sand which is ordinarily used, because of its light weight it has a much greater volume per ton and thus will cover more than twice the area of a ton of sand in this use. Thus I have provided an economical method and arrangement of apparatus for making an improved light weight aggregate from bituminous coal refuse. My process utilizes as a raw material bituminous coal refuse, which is normally considered a waste material and presents a substantial disposal problem. By utilizing the fuel content which is a part of this material for its processing, I have eliminated the necessity of purchasing fuel, which in prior processes has represented about 30% of the operating cost of plants producing light weight aggregate. By pelletizing, drying, and sizing the refuse, I obtain a raw material which is substantially homogeneous in size and moisture content prior to burning. By utilizing a traveling grate stoker with wind boxes located below the stoker, these pellets may be ignited in an oxygen-rich atmosphere and fused to a clinker which can then be ground to form the improved light weight aggregate having the properties and uses described. The heat from the burning pellets is used to heat a refractory arch in the furnace, and radiation from this arch accomplishes initial ignition of the pellets. The heated air from the furnace is also used to dry the pellets after formation. The pellets supply their own fuel to form the large fused clinkers which are discharged from the furnace to be ground to aggregate. By controlling grate speed and the air rate in the wind boxes during ignition travel through the pellet bed, the operator of the furnace may compensate for variations in the combustibility of the raw material to obtain an economic process. The aggregate obtained by this process, in addition to being very light in weight, has the advantages of producing very light stain and reducing "pop-out" in concrete made therefrom, as different from bituminous coal refuse. The aggregate also shows a much lower ignition loss than that made from bituminous coal cinders.

It will thus be seen that the objects set forth above, among those made apparent from the preceding description, are efficiently attained, and since certain changes may be made in carrying out the above process, in the described product, and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. A process for making light weight aggregate from bituminous coal refuse, said refuse including an approximate minimum of 30 percent by weight of combustible material which comprises, in combination, the steps of depositing said refuse as a bed on a grate, igniting said bed by updraft ignition throughout its entire thickness, burning said ignited bed to form fused bloated clinkers, and crushing said clinkers to reduce the size thereof.

2. A process for making light weight aggregate from bituminous coal refuse, said refuse including an approximate minimum of 30 percent by weight of combustible material which comprises, in combination, the steps of forming said refuse into pellets, depositing said pellets on a grate to form a bed, igniting said bed throughout its entire thickness by updraft ignition, burning said ignited pellets to remove combustible materials therefrom and to form fused bloated clinkers, and crushing said clinkers to make a granular product therefrom.

3. A process for making light weight aggregate from bituminous coal refuse, said refuse including an approximate minimum of 30 percent by weight of combustible material which comprises, in combination, the steps of forming said refuse into pellets, continuously depositing said pellets as a bed on the grate of a traveling grate stoker, igniting said bed progressively throughout its entire thickness by updraft ignition, burning said ignited pellet bed to remove combustible materials therefrom and to form fused bloated clinkers, and crushing said clinkers to make a granular product therefrom.

4. A process for making light weight aggregate from bituminous coal refuse, said refuse including an approximate minimum of 30 percent by weight of combustible material which comprises, in combination, the steps of forming said refuse into pellets, drying said pellets, depositing said pellets as a bed on the moving grate of a traveling grate stoker, progressively igniting said pellet bed by updraft ignition throughout its thickness, burning said ignited bed to remove combustible materials therefrom and to form fused, porous clinkers, and crushing the clinkers thus formed to produce said aggregate.

5. The process defined in claim 4 which includes the steps of screening said dried pellets prior to burning to provide pellets of substantially similar size for burning on said traveling grate.

6. A process for making light weight aggregate from bituminous coal refuse, said refuse including an approximate minimum of 30 percent by weight of combustible material which comprises, in combination, the steps of depositing said refuse in a bed on the grate of a traveling grate stoker, igniting said bed throughout its entire thickness by updraft ignition, burning said ignited refuse to remove combustible material therefrom and to form fused, porous clinkers, and reducing the size of said clinkers to make a granular product therefrom, said reducing step including shaking said clinkers in a foundry shakeout for preliminary size reduction.

7. The process defined in claim 6 in which the granular product from which foundry shakeout is further reduced to desired size by grinding, and screened to remove oversize particles therefrom.

8. A process for making light weight aggregate from bituminous coal refuse, said refuse including an approximate minimum of 30 percent by weight of combustible material which comprises, in combination, the steps of depositing said refuse in a bed on the moving grate of a traveling grate stoker, igniting the upper surface of said bed while passing substantially no air therethrough, igniting said bed by updraft ignition throughout its entire thickness, blowing air at a high rate through said bed when completely ignited to cause burnout of combustibles and formation of fused, porous clinkers, cooling said clinkers while blowing air at a low rate through said bed, and reducing the size of said cooled clinkers to make a granular product therefrom.

9. A process for making light weight aggregate from bituminous coal refuse, said refuse including an approximate minimum of 30 percent by weight of combustible material which comprises, in combination, the steps of forming said refuse into pellets, drying said pellets, depositing said pellets in a bed on the moving grate of a traveling grate stoker, igniting the upper surface of said bed while passing substantially no air therethrough, igniting said bed throughout its entire thickness by updraft ignition, blowing air at high rates through said bed when completely ignited to cause burning of combustibles and formation of fused coarse clinkers, cooling said clinkers while blowing air at a low rate upwardly through said bed, and reducing said clinkers to make a granular product therefrom.

10. A process for making light weight aggregate from bituminous coal refuse, said refuse including an approximate minimum of 30 percent by weight of combustible material which comprises, in combination, the steps of depositing said refuse in a constantly rotating drum to form said refuse into pellets, drying the pellets thus formed in a rotary louvered drier, depositing said pellets in a bed on a traveling grate stoker, igniting said bed throughout its entire thickness by updraft ignition, burning said ignited pellets to remove combustibles therefrom and to form fused bloated clinkers, cooling the clinkers thus formed, and reducing said cooled clinkers to a useable size.

11. The process defined in claim 10 which includes the step of draining said refuse prior to forming said refuse into pellets.

12. The process defined in claim 10 which includes the step of screening said pellets after drying and before depositing on said stoker to thereby provide pellets of substantially similar size.

13. The process defined in claim 10 which includes the steps of draining said refuse before forming said refuse into pellets and screening said pellets after drying thereof on a vibrating screen to thereby provide particles of substantially uniform size before depositing said pellets on said traveling grate stoker.

References Cited in the file of this patent

UNITED STATES PATENTS

| | | |
|---|---|---|
| 1,842,801 | Rodgers | Jan. 26, 1932 |
| 1,854,899 | Goldsmith | Apr. 19, 1932 |
| 1,896,625 | Hyde | Feb. 7, 1933 |
| 1,896,884 | Cooper et al. | Feb. 7, 1933 |
| 2,209,636 | Shubert | July 30, 1940 |
| 2,366,400 | Harrison | Jan. 2, 1945 |
| 2,410,267 | Byrns | Oct. 29, 1946 |
| 2,414,734 | Gelbman | Jan. 21, 1947 |
| 2,456,207 | McCoy | Dec. 14, 1948 |
| 2,536,365 | Handwerk et al. | Jan. 1, 1951 |
| 2,729,570 | Nichols | Jan. 3, 1956 |